United States Patent [19]
Jones et al.

[11] Patent Number: 5,168,017
[45] Date of Patent: Dec. 1, 1992

[54] METAL OXIDE-HYDROGEN BATTERY HAVING RECTANGULAR MODULES IN A CYLINDRICAL PRESSURE VESSEL

[75] Inventors: Kenneth R. Jones, Oconomowoc; Paul J. Kaprelian, Raymond, both of Wis.

[73] Assignee: Globe-Union Inc., Milwaukee, Wis.

[21] Appl. No.: 783,004

[22] Filed: Oct. 28, 1991

[51] Int. Cl.$^5$ ........................................ H01M 12/08
[52] U.S. Cl. .................... 429/101; 429/120; 429/185
[58] Field of Search ............ 429/101, 27, 34, 35, 429/57, 26, 120, 181, 182, 206, 163, 159

[56] References Cited

U.S. PATENT DOCUMENTS

| | | |
|---|---|---|
| 3,669,744 | 6/1972 | Tsenter et al. |
| 4,189,527 | 1/1980 | Stadnick et al. ............ 429/26 |
| 4,327,158 | 4/1982 | Holleck ...................... 429/101 |
| 4,477,540 | 10/1984 | Miller et al. ................ 429/27 |
| 4,517,264 | 5/1985 | Miller et al. ................ 429/163 |
| 4,683,178 | 7/1987 | Stadnick et al. ............ 429/101 |
| 4,820,597 | 4/1989 | Lim et al. .................... 429/50 |
| 4,923,769 | 5/1990 | Jones et al. ................ 429/101 |
| 4,957,830 | 9/1990 | Jones ........................ 429/101 |

Primary Examiner—Anthony Skapars
Attorney, Agent, or Firm—Andrus, Sceales, Starke & Sawall

[57] ABSTRACT

An improved metal oxide hydrogen battery including an outer pressure vessel and a plurality of cell modules are stacked in side-by-side relation in the vessel. Each cell module is generally rectangular in configuration and includes positive and negative terminals which are located centrally of the cell module. Each cell module is sealed within a rigid plastic casing and the casing is provided with a vent which permits the flow of gas but is impermeable to the flow of the liquid electrolyte contained within the cell module. A heat transfer member is disposed between adjacent cell modules and includes an outer cylindrical flange which is disposed in heat transfer relation with the inner wall of the pressure vessel. The peripheral edge of each casing is engaged with the inner surface of the respective flange to position the cell module within the vessel. Electrical conductors extend in sealed relation through the wall of the casing and connect the terminals of the cell modules in an electrical circuit.

17 Claims, 1 Drawing Sheet

U.S. Patent     Dec. 1, 1992     5,168,017
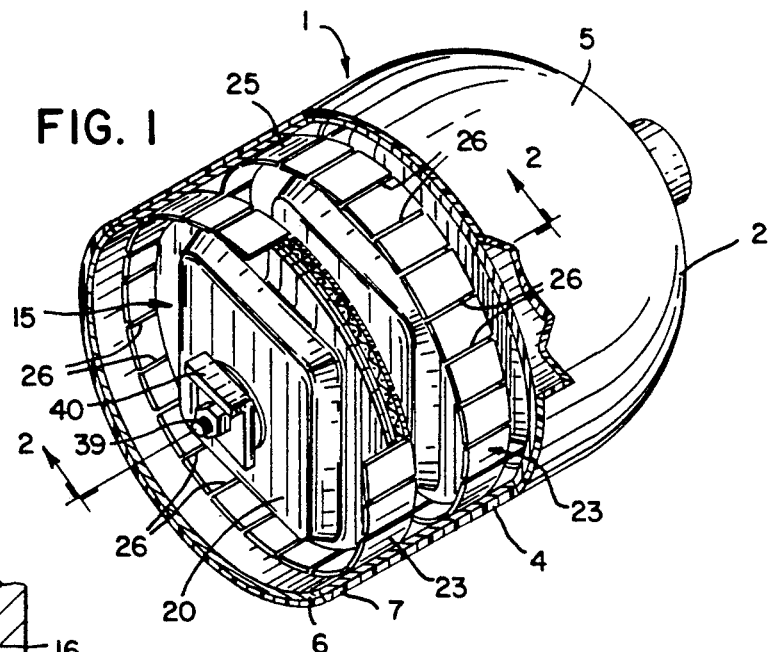
FIG. 1
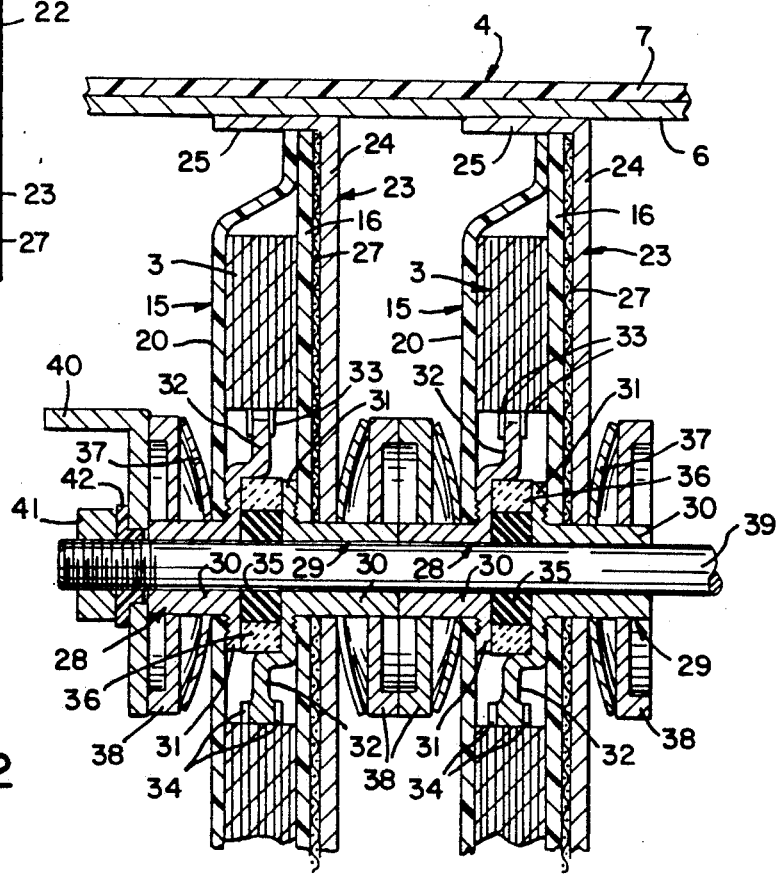
FIG. 3
FIG. 2

METAL OXIDE-HYDROGEN BATTERY HAVING RECTANGULAR MODULES IN A CYLINDRICAL PRESSURE VESSEL

BACKGROUND OF THE INVENTION

Metal oxide-hydrogen batteries, such as nickel oxide-hydrogen batteries, have seen use as aircraft starter batteries and in aerospace applications because they are rechargeable, have an extremely long cycle life and provide a uniform output throughout the entire discharge cycle.

In the typical nickel oxide-hydrogen battery, the battery cells are sealed in an outer pressure vessel that contains pressurized hydrogen gas. On discharge of the battery, the hydrogen gas diffuses through the electrolyte surrounding the catalyst surfaces of the negative plates and becomes disassociated to the mono-atomic form. The mono-atomic hydrogen is ionized and combines with hydroxyl ions to form water, with an electron being released in the process of forming each hydrogen ion. In addition, hydroxyl ions are formed at the positive electrode by the reaction of water with the available oxygen content of the nickel oxide. As a result of these reactions, an electron current is produced in the exterior circuit.

On recharging, the reaction is reversed, with the recharging being characterized by the regeneration of hydrogen at the negative electrode and the reoxidation of nickel at the positive electrode.

To withstand the substantial pressures generated by the hydrogen gas, the pressure vessel is generally cylindrical in shape and the practice has been to form the cell modules with a conforming circular configuration. This necessitates cutting curved or circular shaped electrode plates from strips of raw material which results in a high level of expensive scrap.

When using circular cell modules, the electrical connections to the electrodes have normally been at the peripheral edges of the electrode plates. With the electrical connections at the peripheral edge, the electron flow path is lengthened which increases the resistance and reduces the efficiency of the battery.

SUMMARY OF THE INVENTION

The invention is directed to an improved metal oxide-hydrogen battery utilizing generally rectangular cell modules in a cylindrical pressure vessel and having the electrical connections to the cell modules located centrally of the cell modules.

In accordance with the invention, the battery includes an outer, generally cylindrical pressure vessel and a plurality of cell modules are positioned in side-by-side stacked relation within the vessel. Each cell module is generally rectangular in configuration and includes positive and negative electrodes which are located centrally of the cell module. Each cell module contains a liquid electrolyte, such as a potassium hydroxide solution.

Each cell module is sealed within a rigid casing composed of an electrically insulating material, preferably a thermoplastic resin, which is impervious to the flow of the liquid electrolytes.

A heat transfer member or fin, composed of metal or other material having a high coefficient of thermal conductivity, is located between adjacent cell modules and each heat transfer member is provided with an outer cylindrical flange which is disposed in heat transfer relation with the inner wall of the pressure vessel. The outer periphery of the thermoplastic casing bears against the inner surface of the flange to position the cell module assembly within the vessel.

To permit the flow of gas into and out of the casing, each casing is provided with a vent which is permeable to the flow of gas but impermeable to the flow of the liquid electrolyte.

Each cell module is formed with a central opening which is aligned with apertures in the outer casing and electrical conductors extend through the aligned apertures and opening to connect the electrodes of the cell modules in an electric circuit.

To clamp the sealed cell modules and heat transfer fins in stacked side-by-side relation, a threaded insulated rod extends through the aligned central apertures in the casings and the openings in the cell modules, and the ends of the rod receive nuts. By threading down the nuts, the cell modules can be clamped together in tight bearing relation.

With the construction of the invention, the electrode plates of the cell modules have a rectangular configuration which enables the electrode plates to be cut from strip stock with minimum scrappage, thus reducing the overall cost of the battery.

The rigid plastic casing which encloses each cell module seals the cell module and prevents leakage or capillary migration of the electrolyte from the cell module and possible bridging between cell modules which could cause a shorting path. In addition, the casings, being rigid, serve to locate or position the cell modules within the pressure vessel and prevent radial movement of the cell modules within the vessel which could possibly cause damage to the cell modules.

As a further advantage, the connections to the positive and negative electrodes of the cell modules are made at the central portion of the cell modules, thus providing a shortened electron flow path as compared to a peripheral edge connection. This reduces the resistance and provides a more efficient battery.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of the metal oxide-hydrogen battery of the invention with parts broken away in section;

FIG. 2 is an enlarged fragmentary longitudinal section of the battery; and

FIG. 3 is a fragmentary enlarged section showing the construction of the cell module vent.

DESCRIPTION OF THE ILLUSTRATED EMBODIMENT

FIG. 1 illustrates a rechargeable, metal oxide-hydrogen battery 1, such as a nickel oxide-hydrogen battery. The battery 1 is composed of an outer pressure vessel 2 that houses a series of cell modules 3 which are disposed in side-by-side stacked relation.

Pressure vessel 2 includes a generally cylindrical shell 4, the open ends of which are enclosed by dome-shaped heads 5. The shell 4 and heads 5 can be composed of an inner metal liner 6 formed of a high strength, corrosion resistant metal, such as Inconel or stainless steel, and an outer layer of fibrous material impregnated with a thermosetting resin can be wound around the liner 6 by conventional element winding techniques.

Each cell module 3 has a central opening and can be composed of a pair of back-to-back positive electrodes 10 which are spaced apart by an absorber layer 11, along with a pair of negative electrodes 12. The negative electrodes 12 are separated from adjacent positive electrodes by non-conductive separator layers 13. In addition, a gas diffuser screen 14 an be located on the outer surface of each negative electrode 12.

More particularly, each cell module 3 can be constructed in the manner described in U.S. Pat. No. 4,957,830, in which the positive electrodes are in the form of flat or sintered metal plaques impregnated with nickel hydroxide, while the negative electrodes can be in the form of fine mesh metal screens having a catalyst, such a platinum black, bonded to one surface of the screen through a hydrophobic polymeric material. A liquid electrolyte, such a potassium hydroxide solution, is impregnated in the fibrous separator layers 13 that separate the electrodes. The specific construction of the cell module 3 in itself is conventional and forms no part of the present invention.

Each cell module is sealed in a rigid casing 15, preferably formed of a molded thermoplastic resin, which is impervious to the passage of the liquid electrolyte and thus prevents the electrolyte from one cell module from migrating to an adjacent cell module and thereby bridging the cell modules. Each casing 15 is composed of a pair of sections 16 and 17 which are joined together, preferably by heat sealing, along their peripheral edge portions to provide the sealed structure. As best seen in FIG. 2, section 16 is flat and is provided with a central opening which is aligned with the opening 9 in cell module 3. Section 17 is also formed with a central opening, which is aligned with the opening in section 16, and the portion of section 17 bordering opening is provided with a pocket or enlargement 20 to receive the cell module 3. As shown in FIG. 2, the pocket 20 conforms to the rectangular configuration of the cell module, while the peripheral edge of casing 15 is circular in configuration and is located adjacent the inner surface of vessel 2.

To permit the flow of gas between the cell modules 3 and the interior of the pressure vessel 2, each casing 15 is provided with one or more vents 22, as seen in FIG. 3. Vents 22 are permeable to the flow of gas, but impermeable to the flow of the liquid electrolyte, so that the electrolyte cannot pass through the vents to the exterior of the casing. Vents 22 can be formed of a material sold under the tradename Gortex, which is composed of Teflon (polytetrafluoroethylene) fibers.

To aid in transferring heat from the cell modules 3 to the pressure vessel 2, a heat transfer fin or member 23 is located between adjacent sealed cell modules 3. Each heat transfer member 23 includes a generally circular body portion 24 and an outer cylindrical flange 25 which is positioned in contact with the inner surface of vessel 2. Flange 25 can be formed with a series of generally parallel longitudinal slits 26 which provide a degree of flexibility for the flange and enable the flange to conform to the vessel wall, if the vessel wall is slightly deformed or out of round.

Heat transfer members 23 are formed of metal or other material having a high coefficient of thermal conductivity to aid in transferring heat from the cell modules 3 to the pressure vessel 2.

As illustrated in FIGS. 2 and 3, a gas permeable screen 27 formed of plastic, or other electrically insulating material, can be positioned between section 16 of casing 15 and body 24 of heat transfer member 23. The screen 27 facilitates the flow of gas into and out of the vent 22 in the casing.

As seen in FIG. 2, the peripheral edge of casing 15 bears against the inner surface of flange 25 of the heat transfer member. As the casing 15 a molded rigid member, it serves to position or locate the cell modules 3 within the vessel 2 and prevents the cell modules from shifting radially within the vessel if the battery is subjected to an external impact.

To connect the terminals of the cell modules 3 in an electric circuit, a pair of conductors 28 and 29 are associated with each cell module 3. Each conductor 28 and 29 includes a cylindrical sleeve 30, which extends through a hole or aperture in casing 15, and a flange 31, which extends radially from sleeve 30, is located within the casing. Flange 31 of conductor 28 is connected via a comb 32 to tabs 33 on the positive electrodes of the cell module, while the flange 31 of the conductor 29 is connected by a similar comb 32 to tabs 34 on the negative electrodes of the cell module 2.

As shown in FIG. 2, the flanges 31 of the conductors 28 and 29 of each cell module are insulated from each other by an inner electrically insulating washer 35 formed of a material, such as nylon, and an outer washer 36, which can be formed of the ceramic material. The ceramic washers 36, being rigid, will prevent excessive compression of the nylon washers 35 when the entire mechanism is compressed axially as will be hereinafter described.

A resilient member, such as a Bellville washer or spring 37 is disposed around the cylindrical sleeve 30 of each of the conductors 28 and 29. One end of each washer 37 bears against an annular metal seat 38 while the opposite end of each washer 37 bears against the portion of the plastic casing 15 bordering the hole therein and forces the casing against the flange 31 of the respective conductor. The outer surface of each flange 31 can be provided with surface deviations, such as serrations, which will tend to mechanically lock the casing 15 against the flange 31.

To clamp the cell modules in side-by-side relation, a tie rod 39 extends through the openings in the conductors 28 and 29. Tie rod 39 is preferably composed of a central metal core and has an insulating outer coating, which can be formed of a material such as Teflon. With the conductors 28 and 29 assembled on the tie rod 39, the end of each positive conductor 28 will be in electrical contact with the abutting end of the next adjacent negative conductor 29, as shown in FIG. 2.

Positive and negative terminal brackets 40 are mounted on the ends of the tie rod 39 and nuts 41 are threaded on the ends of the tie rod, as shown in FIG. 2. An insulating washer 42 insulates the nut 41 from the terminal bracket 40, as well as insulating the terminal bracket from the tie rod 39.

As nuts 41 are tightened down on the tie rod 39, the Bellville washers 37 will be compressed to create an annular area of contact around each hole in the casing 15 to thereby tightly seal the casing to the respective conductor 28 and 29. Through this sealing arrangement, migration of the electrolyte through the holes in the casing is eliminated, thus preventing the cell modules 3 from drying out and also eliminating the possibility of shunt currents being developed, which could cause premature failure of the battery.

With the construction of the invention, the cell modules 3 have a rectangular shape and the electrodes can be cut from stock strips of material, thus reducing scrappage, as compared to cell modules having a circular or curved configuration.

The molded rigid plastic casings 15 serve a dual function, for they not only seal the cell modules to prevent migration of the liquid electrolyte from the cell modules, but also serve to position the cell modules within the vessel and prevent shifting and possible damage to the cell modules in the event the battery is subjected to an external impact.

Various modes of carrying out the invention are contemplated as being within the scope of the following claims particularly pointing out and distinctly claiming the subject matter which is regarded as the invention.

We claim:

1. In a metal oxide-hydrogen battery, a generally cylindrical outer pressure vessel, a plurality of cell modules disposed within said vessel in side-by side relation, each cell module including a positive terminal and a negative terminal and containing a liquid electrolyte, said terminals being located generally centrally of the cell module, each cell module being generally rectangular in planar configuration, a sealed rigid electrically insulating casing enclosing each cell module, each casing having a peripheral edge disposed in bearing engagement with said vessel, means for preventing relative movement of each cell module with respect to the corresponding casing, and electrical connecting means for connecting the terminals of said cell modules in an electrical circuit.

2. The battery of claim 1, and including a heat transfer member disposed between adjacent cell modules and having a generally circular peripheral edge portion disposed in heat transfer relation with said pressure vessel.

3. The battery of claim 2, wherein said heat transfer member has an outer peripheral flange disposed in engagement with said pressure vessel.

4. The battery of claim 3, wherein said flange is provided with a plurality of spaced longitudinally extending slits.

5. The battery of claim 1, and including vent means disposed in said casing, said vent means being permeable to the flow of gas but impermeable to the flow of said liquid electrolyte.

6. The battery of claim 1, wherein each casing is composed of a first section and a second section, said sections having peripheral edge portions disposed in flatwise relation, and sealing means for sealing said peripheral edge portions.

7. The battery of claim 6, wherein said sections are formed of thermoplastic material and said sealing means comprises a heat seal.

8. The battery of claim 1, wherein each cell module is provided with a central opening and each casing is formed with a pair of apertures aligned with the opening in the corresponding cell module, said electrical conducting means extending through said aligned apertures and opening.

9. The battery of claim 8, and including clamping means disposed within said aligned apertures and openings for clamping said cell modules in side-by-side stacked relation.

10. A metal oxide-hydrogen battery, comprising a generally cylindrical pressure vessel, a plurality of cell modules disposed in side-by-side stacked relation within said vessel, each cell module having a positive terminal and a negative terminal and containing a liquid electrolyte, said terminals being located centrally of the cell module, each cell module being generally rectangular in planar configuration, a sealed rigid plastic casing enclosing each cell module, each casing having a generally circular peripheral edge, a heat transfer member disposed between adjacent cell modules and including a flat body and an outer longitudinally extending peripheral flange disposed in heat transfer relation with the inner surface of said vessel, the peripheral edge of each casing disposed in engagement with the flange of the respective heat transfer member, each cell module having a central opening and each casing having a pair of apertures aligned with said opening in said cell module, and electrical connecting means extending through the aligned apertures and opening for connecting said terminals in an electric circuit.

11. The battery of claim 11, wherein each casing is formed of a pair of sections, said sections having peripheral edge portions disposed in flatwise relation, and sealing means for sealing said edge portions together.

12. The battery of claim 11, wherein at least one of said sections is provided with a generally rectangular-shaped pocket to receive the respective cell module.

13. The battery of claim 11, and including vent means disposed in a first of said sections, said vent means being permeable to the flow of gas but impermeable to the flow of the liquid electrolyte.

14. The battery of claim 13, wherein said first section is disposed adjacent the body of said heat transfer member, and said battery also includes a gas permeable spacer disposed between said first section and said body.

15. The battery of claim 10, and including clamping means disposed in said aligned apertures and openings for clamping said cell modules in side-by-side stacked relation.

16. The battery of claim 15, wherein said clamping means comprises an insulated rod, and means disposed on at least one end of said rod and constructed to urge said cell modules axially of said rod to thereby clamp said cell modules in stacked relation.

17. A metal oxide-hydrogen battery, comprising a generally cylindrical pressure vessel, a plurality of cell modules disposed in side-by-side stacked relation within said vessel, each cell module having a positive terminal and a negative terminal and containing a liquid electrolyte, said terminals being located centrally of the cell module, each cell module being generally rectangular in planar configuration, a sealed rigid plastic casing enclosing each cell module, each casing having a generally circular peripheral edge disposed in proximate relation to the inner surface of said vessel and having a generally rectangular pocket to receive the cell module, vent means disposed in said casing and being permeable to the flow of gas but impermeable to the flow of liquid electrolyte, and electrical connecting means for connecting the terminals of said cell modules in an electrical circuit.

* * * * *

UNITED STATES PATENT AND TRADEMARK OFFICE
CERTIFICATE OF CORRECTION

PATENT NO. : 5,168,017
DATED : December 1, 1992
INVENTOR(S) : KENNETH R. JONES ET AL It is certified that error appears in the above-indentified patent and that said Letters Patent is hereby corrected as shown below:

Col. 6, line 24, claim 11, delete "11" should read --10--

Signed and Sealed this

Fifth Day of July, 1994

Attest:

BRUCE LEHMAN

Attesting Officer        Commissioner of Patents and Trademarks